US012490042B2

(12) United States Patent
Davis et al.

(10) Patent No.: US 12,490,042 B2
(45) Date of Patent: Dec. 2, 2025

(54) METHOD AND APPARATUS FOR LOCATION-BASED AUDIO SIGNAL COMPENSATION

(71) Applicant: QUALCOMM Incorporated, San Diego, CA (US)

(72) Inventors: Graham Bradley Davis, Seattle, WA (US); Jason Filos, San Diego, CA (US); Nils Gunther Peters, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 90 days.

(21) Appl. No.: 17/760,430

(22) PCT Filed: Mar. 8, 2021

(86) PCT No.: PCT/US2021/021372

§ 371 (c)(1),
(2) Date: Aug. 9, 2022

(87) PCT Pub. No.: WO2021/206836

PCT Pub. Date: Oct. 14, 2021

(65) Prior Publication Data

US 2023/0061896 A1 Mar. 2, 2023

(30) Foreign Application Priority Data

Apr. 7, 2020 (GR) .............................. 20200100177

(51) Int. Cl.
*H04S 7/00* (2006.01)
*H04R 3/04* (2006.01)

(52) U.S. Cl.
CPC ............... *H04S 7/303* (2013.01); *H04R 3/04* (2013.01); *H04S 7/301* (2013.01);
(Continued)

(58) Field of Classification Search
CPC ............ H04S 7/303; H04S 7/301; H04R 3/04
See application file for complete search history.

(56) References Cited

U.S. PATENT DOCUMENTS

| | | | | |
|---|---|---|---|---|
| 2009/0304205 | A1* | 12/2009 | Hardacker | H04S 7/303 381/104 |
| 2013/0066453 | A1 | 3/2013 | Seefeldt | |
| 2016/0261247 | A1 | 9/2016 | Aggarwal et al. | |

FOREIGN PATENT DOCUMENTS

| | | | |
|---|---|---|---|
| CN | 106941645 | A | 7/2017 |

OTHER PUBLICATIONS

International Search Report and Written Opinion—PCT/US2021/021372—ISA/EPO—May 12, 2021, pp. 1-11.

* cited by examiner

*Primary Examiner* — Ping Lee
(74) *Attorney, Agent, or Firm* — Qualcomm Incorporated; Espartaco Diaz Hidalgo

(57) ABSTRACT

A device to perform location-based audio signal compensation includes a memory configured to store instructions and one or more processors. The one or more processors are configured to execute the instructions to receive an audio input signal corresponding to sound received from a second device, determine position data indicative of a position of the device, and generate, based on the audio input signal, a compensation filter to be applied to an audio playback signal prior to playout from the second device, to at least partially compensate for distortion associated with sound propagation from the second device to the position of the device.

28 Claims, 9 Drawing Sheets

(52) U.S. Cl.
CPC ....... *H04R 2420/07* (2013.01); *H04S 2400/11* (2013.01); *H04S 2400/15* (2013.01)

600

| Entry 602 | Device ID 604 | Position 606 | Filter 608 | |
|---|---|---|---|---|
| 1 | 01 | $[x_1, y_1, z_1]$ | $h_1(n)$ | 612 |
| 2 | 01 | $[x_2, y_2, z_2]$ | $h_2(n)$ | 614 |
| 3 | 02 | $[x_3, y_3, z_3]$ | $h_3(n)$ | 616 |
| | | ⋮ | | |
| N | 01 | $[x_N, y_N, z_N]$ | $h_N(n)$ | 618 |

METHOD AND APPARATUS FOR LOCATION-BASED AUDIO SIGNAL COMPENSATION

I. CROSS-REFERENCE TO RELATED APPLICATIONS

The present application claims priority from Greece Provisional Patent Application No. 20200100177, filed Apr. 7, 2020, entitled "METHOD AND APPARATUS FOR LOCATION-BASED AUDIO SIGNAL COMPENSATION," which is incorporated by reference in its entirety.

II. FIELD

The present disclosure is generally related to compensation filters for audio playback.

III. DESCRIPTION OF RELATED ART

When designing a sound bar or a "smart speaker" device (e.g., a wireless speaker and voice command device with an integrated assistant application), it is common to perform electro-acoustic compensation (or equalization) offline, during the design phase of the product, often using an anechoic room. However, such a pre-compensation does not account for non-linearities introduced by the acoustic environment when the device is used by an end-user. For example, non-linearities may be introduced by characteristics of a room in which the device is operated, such as the shape or geometry of the room, materials used in the room, reverberation characteristics, etc.

Equalization for the room response conventionally consists of a cumbersome manual calibration procedure in which the user is asked to wear a headset with a co-located microphone and a set of noise/tone signals are played out from the smart speaker or sound bar. Such manual calibration procedures often take a long time to complete, and often can require the user to sit stationary for 15 minutes, and sometimes up to 30 minutes, while the smart speaker or sound bar emits sounds that are generally perceived as annoying to the user. Such calibration procedures are designed to compensate for the room response at the location of the headset, but often suffer from reduced sound quality for listeners at other locations in the room.

Further, some sound bars and smart speaker devices are not designed to enable manual calibration, such as "legacy" devices or lower-cost devices that may lack on-board processing, microphones, or both. The lack of compensation for the local acoustic environment (other than at a specific location for a manually calibrated sound bar or smart speaker device) can result in a sub-optimal listening experience due to reduced audio quality.

IV. SUMMARY

According to one implementation of the techniques disclosed herein, a device to perform location-based audio signal compensation includes a memory configured to store instructions and one or more processors. The one or more processors are configured to execute the instructions to receive an audio input signal corresponding to sound received from a second device, determine position data indicative of a position of the device, and generate, based on the audio input signal, a compensation filter to be applied to an audio playback signal prior to playout from the second device, to at least partially compensate for distortion associated with sound propagation from the second device to the position of the device.

According to another implementation of the techniques disclosed herein, a method of performing location-based audio signal compensation includes receiving, at one or more processors of a first device, an audio input signal corresponding to sound received from a second device. The method also includes determining position data indicative of a position of the first device and generating, based on the audio input signal, a compensation filter to be applied to an audio playback signal prior to playout from the second device, to at least partially compensate for distortion associated with sound propagation from the second device to the position of the first device.

According to another implementation of the techniques disclosed herein, an apparatus includes means for receiving sound from a sending device and generating an audio input signal corresponding to the sound. The apparatus also includes means for determining position data indicative of a position of the means for receiving sound and means for generating, based on the audio input signal, a compensation filter to be applied to an audio playback signal prior to playout from the sending device, to at least partially compensate for distortion associated with sound propagation from the sending device to the position of the means for receiving sound.

According to another implementation of the techniques disclosed herein, a non-transitory computer-readable medium includes instructions for location-based audio signal compensation. The instructions, when executed by one or more processors of a first device, cause the one or more processors to receive an audio input signal corresponding to sound received from a second device, determine position data indicative of a position of the first device, and generate, based on the audio input signal, a compensation filter to be applied to an audio playback signal prior to playout from the second device, to at least partially compensate for distortion associated with sound propagation from the second device to the position of the first device.

V. BRIEF DESCRIPTION OF THE DRAWINGS

VI. DETAILED DESCRIPTION

Figure 1:
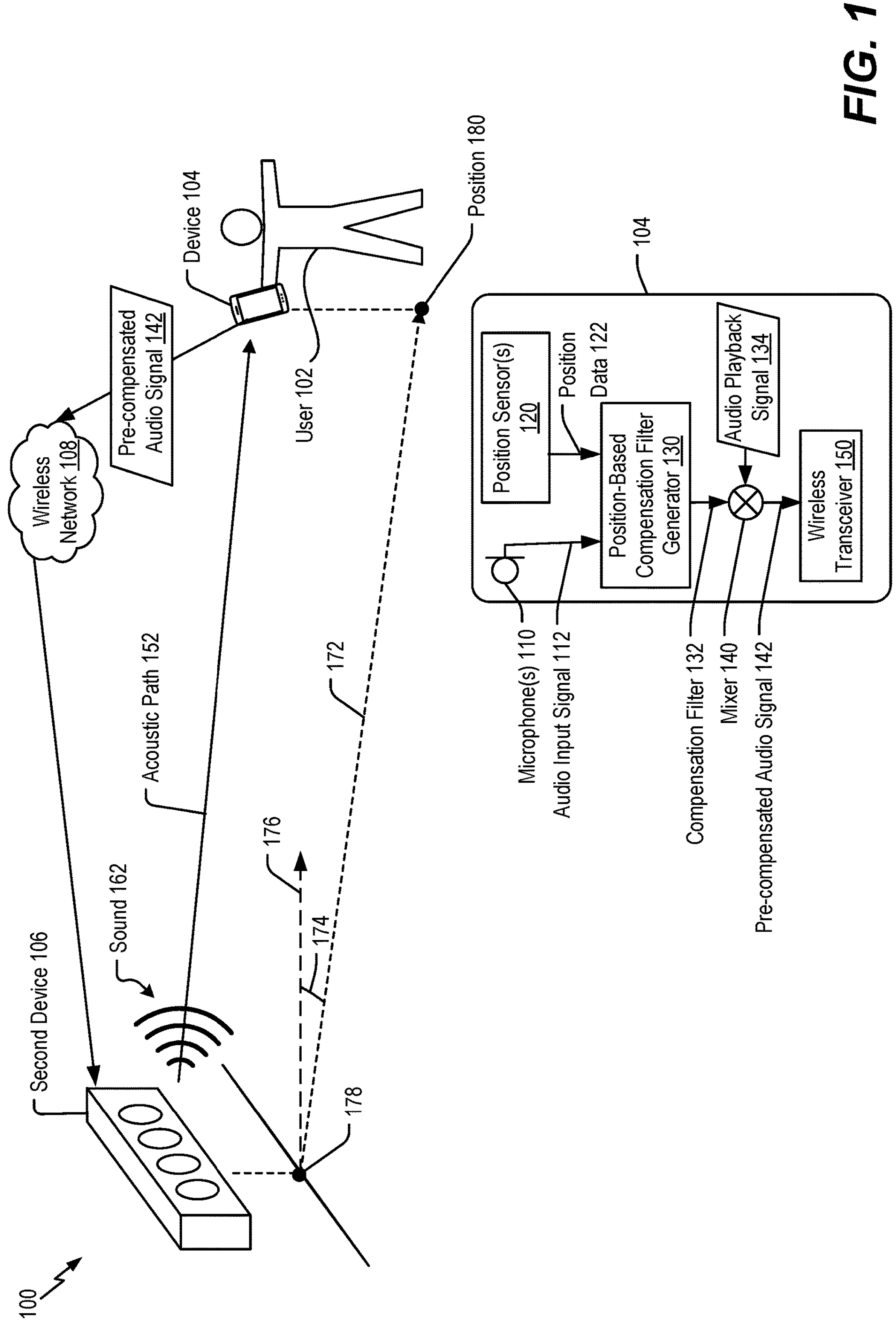
FIG. 1 is a diagram of a particular illustrative implementation of a system including a device operable to perform location-based audio signal compensation, in accordance with some examples of the present disclosure.

Devices and methods to perform location-based audio signal compensation are described. A portable device with one or more microphones, such as a smartphone or smart watch, is used to measure the acoustic response associated with an audio playback device, such as a sound bar or smart speaker device. The portable device determines its own location based on absolute or relative location information and generates or retrieves a compensation filter associated with that location. In some implementations, such as when the portable device streams user-selected audio content to the playback device for playback, the portable device applies the compensation filter to generate a pre-compensated audio content that is streamed to the playback device. In other implementations, the portable device sends the compensation filter to the playback device for onboard processing at the playback device.

In some implementations, management of system identification and compensation filter generation is performed by the portable device, by another device, such as a server, or distributed among multiple devices. Multiple compensation filters can be generated, with each compensation filter corresponding to a different location. Each compensation filter can be stored with information indicating its associated location to be retrievable for future use by a listener at that location. In some examples, information regarding the portable device, the playback device, or both, is also stored in connection with the compensation filter to enable the portable device to distinguish between multiple compensation filters that are associated with the same location, such as when compensation filters have been generated for different playback devices (e.g., a sound bar and a conference call system) that are located within the same room or acoustic environment.

Use of the portable device to generate or retrieve location-specific compensation filters enables audio signal compensation to be performed using the location of the portable device as a proxy for a location of the user of the portable device. For example, the portable electronic device may be carried by the user, worn on the user's body (e.g., on a wrist), or placed in close proximity to the user. The resulting location-specific compensation enables an improved audio experience for the user.

In some examples, techniques described herein enable electro-acoustic and device-specific sound reproduction to be at least partially equalized. To illustrate, variability associated with components of the playback device (e.g., transducers within relatively low-cost or "lower-tier" models of the playback device) can be at least partially alleviated via generation and use of a location-specific compensation filter for that particular playback device. In another example, improved time-alignment and phase-correction can be provided for multi-channel arrangements. As a further example, speech intelligibility in the audio can be improved via use of location-specific compensation filtering, such as due to reverberation reduction. Improved speech intelligibility can enhance a user experience during voice user interface interactions, video calls, teleconferencing, and audio content with dialog such as podcasts or movies, as illustrative, non-limiting examples.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from another component, block or device), and/or retrieving (e.g., from a memory register or an array of storage elements).

Unless expressly limited by its context, the term "producing" is used to indicate any of its ordinary meanings, such as calculating, generating, and/or providing. Unless expressly limited by its context, the term "providing" is used to indicate any of its ordinary meanings, such as calculating, generating, and/or producing. Unless expressly limited by its context, the term "coupled" is used to indicate a direct or indirect electrical or physical connection. If the connection is indirect, there may be other blocks or components between the structures being "coupled". For example, a loudspeaker may be acoustically coupled to a nearly wall via an intervening medium (e.g., air) that enables propagation of waves (e.g., sound) from the loudspeaker to the wall (or vice-versa).

The term "configuration" may be used in reference to a method, apparatus, device, system, or any combination thereof, as indicated by its particular context. Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). In the case (i) where A is based on B includes based on at least, this may include the configuration where A is coupled to B. Similarly, the term "in response to" is used to indicate any of its ordinary meanings, including "in response to at least." The term "at least one" is used to indicate any of its ordinary meanings, including "one or more". The term "at least two" is used to indicate any of its ordinary meanings, including "two or more".

The terms "location" and "position" are used interchangeably unless otherwise indicated by the particular context. The terms "apparatus" and "device" are used generically and interchangeably unless otherwise indicated by the particular context. Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The terms "method," "process," "procedure," and "technique" are used generically and interchangeably unless otherwise indicated by the particular context. The terms "element" and "module" may be used to indicate a portion of a greater configuration. The term "packet" may correspond to a unit of data that includes a header portion and a payload portion. Any incorporation by reference of a portion of a document shall also be understood to incorporate definitions of terms or variables that are referenced within the portion, where such definitions appear elsewhere in the document, as well as any figures referenced in the incorporated portion.

As used herein, the term "communication device" refers to an electronic device that may be used for voice and/or data communication over a wireless communication network. Examples of communication devices include speaker bars, smart speakers, cellular phones, personal digital assistants (PDAs), handheld devices, headsets, wireless modems, laptop computers, personal computers, etc.

FIG. 1 depicts a system 100 that includes a device 104 to perform location-based audio signal compensation. The device 104 is wirelessly coupled to a second device 106 via a wireless network 108. The second device 106 includes one or more speakers, such as a sound bar, a smart speaker device, or another device with audio playback capability. The device 104 is proximate to (e.g., held by) a user 102 and is located at a position 180 relative to the second device 106. The device 104 is configured to send a pre-compensated audio signal 142 to the second device 106 for playout by the second device 106. The pre-compensated audio signal 142 is configured to reduce or eliminate distortion of sound 162 played out by the second device 106 and received at the device 104 via an acoustic path 152, such as due to the geometry, materials, and furniture in the acoustic environment, due to non-ideal operation of electronic components in the second device 106, or a combination thereof.

The acoustic path 152 between the second device 106 and the device 104 represents a propagation of sound played out by the second device 106 and received at the device 104. The sound received at the device 104 may differ from the sound played out of the second device 106 due to one or more distortion effects. Although the acoustic path 152 is illustrated as a straight arrow for ease of illustration, it should be understood that the acoustic path 152 may include a combination or superposition of multiple paths via which sound from the second device 106 arrives at the one or more microphones 110 of the device 104, such as via one or more reflections off of one or more walls, the ceiling, the floor one or more pieces of furniture or other items, or any combination thereof. As a result, the acoustic path 152 is associated with distortion which may include attenuation, amplification (e.g., in the case of acoustic resonance), delay, echoes, other distortion, or any combination thereof.

The device 104 (also referred to as "first device 104") is a portable device, such as a portable communication device (e.g., a smart phone) or a wearable electronic device (e.g., a smart watch), as illustrative, non-limiting examples. The device 104 includes one or more microphones 110, one or more position sensors 120, a position-based compensation filter generator 130, a mixer 140, and a wireless transceiver 150 (e.g., a wireless transmitter, a wireless receiver, or both).

The one or more microphones 110 are configured to generate an audio input signal 112 responsive to receiving the sound 162 from the second device 106. The one or more position sensors 120 are configured to determine position data 122 indicative of a position 180 of the device 104. In some implementations, the position data 122 is determined based on at least one of: acoustic position sensing, millimeter wave-based sensing, ultrasonic sensing, satellite-based positioning, camera-based tracking (e.g., image or infrared tracking of the user 102) data that is received from the second device, or any combination thereof.

For example, the one or more position sensors 120 can include one or more microphones (e.g., the one or more microphones 110) and associated electronics configured to determine acoustic positioning (e.g., to determine a direction and distance of the second device 106 based on differences of the received sound 162 at the various microphones). In another example the one or more position sensors 120 include a radiofrequency (RF) position sensor, such as an array of millimeter-wave (mmWave) antennas and associated electronics configured to determine positioning relative to one or more mmWave sources. In other examples, the one or more position sensors 120 include ultrasonic sensors, a satellite-based positioning (e.g., global positioning system (GPS)) unit, a camera-based tracking unit at the device 104, one or more receivers to receive camera-based user tracking data from the second device 106, a motion-based tracking unit (e.g., a motion or acceleration sensor to enable position tracking via dead reckoning), or any combination thereof.

The position data 122 can indicate the position 180 as an absolute position, such as when the position data 122 includes satellite-based positioning information. Alternatively, or in addition, the position data 122 can indicate the position 180 as a relative position based on particular reference. As illustrated, the position 180 is identified in terms of a distance 172 from a reference position 178 and an offset angle 174 from a reference direction 176. Although two-dimensional polar coordinates are depicted for purpose of illustration, in other implementations any other two-dimensional or three-dimensional coordinate system can be used, such as three-dimensional spherical coordinates, two-dimensional cartesian coordinates (e.g., (x, y) coordinates), or three-dimensional cartesian coordinates (e.g., (x, y, z) coordinates), as non-limiting examples. Similarly, although the reference position 178 and the reference direction 176 are depicted based on the position and orientation of the second device 106, in other implementations any coordinate origin can be used, such as based on a room geometry as an illustrative, non-limiting example.

The position-based compensation filter generator 130 is configured to generate the compensation filter 132 based on the audio input signal 112 and prior to playout of an audio playback signal 134 at the second device 106. The compensation filter 132 is generated to be applied to an audio playback signal 134 to at least partially compensate for distortion associated with sound propagation from the second device 106 to the position 180 of the device 104. For example, the position-based compensation filter generator 130 is operable to perform an acquisition operation that includes sending a test signal to the second device 106 for playback and processing the audio input signal 112 resulting from playback of the test signal to generate the compensation filter 132. An example of an acquisition operation is described with reference to FIG. 2.

The mixer 140 is configured to apply the compensation filter 132 to the audio playback signal 134 (e.g., convolution) to generate the pre-compensated audio signal 142. For example, the audio playback signal 134 may correspond to an audio file retrieved from a memory of the device 104, a media stream received from a remote source (e.g., a media server), an audio component of a teleconference or a video call, one or more other sources of audio content, or any combination thereof. In some implementations, the audio playback signal 134 is convolved with the compensation filter 132 to obtain a corrected (e.g., at least partially equalized) response that mitigates adverse acoustic effects within the second device 106 and along the acoustic path 152.

The device 104 is configured to send the pre-compensated audio signal 142 to the second device 106 for playout. For example, the pre-compensated audio signal 142 is provided to the wireless transceiver 150 for transmission to the second device 106 via the wireless network 108. To illustrate, the wireless network 108 can correspond to a wireless telephone or data network, an Institute of Electrical and Electronics Engineers (IEEE) 802.11-type network (e.g., Wi-Fi), a short-distance, ad-hoc network (e.g., Bluetooth), one or more other networks, or any combination thereof (Wi-Fi is a trademark of Wi-Fi Alliance, Bluetooth is a trademark of BLUETOOTH SIG, INC.). In other implementations, at least a portion of the transmission of the pre-compensated audio signal 142 from the device 104 to the second device 106 is performed via a wired network.

As described in further detail with reference to FIG. 2 and FIG. 3, in some implementations the position-based compensation filter generator 130, the mixer 140, or both, are implemented via one or more processors that are configured to execute instructions to generate the compensation filter 132, to apply the compensation filter 132 to the audio playback signal 134, or a combination thereof. Alternatively, or in addition, in some implementations, at least a portion of the position-based compensation filter generator 130, the mixer 140, or both, is implemented using dedicated circuitry.

During operation, the user 102 may select to play audio content at the second device 106, such as by selection of a playlist via a graphical user interface at the device 104. The device 104 determines the position 180 of the device 104 based on the position data 122 and determines whether a compensation filter associated with the position 180 (e.g., the compensation filter 132) is available for use, such as described in further detail with reference to FIG. 3 and FIG. 5. If the compensation filter 132 is not available, the position-based compensation filter generator 130 generates the compensation filter 132 during an acquisition operation, such as described in further detail with reference to FIG. 2.

Upon generating or retrieving the compensation filter 132, the device 104 applies the compensation filter 132 to the audio playback signal 134 corresponding to the user-selected audio content to generate the pre-compensated audio signal 142. The wireless transceiver 150 transmits the pre-compensated audio signal 142 to the second device 106 for playback.

The second device 106 receives the pre-compensated audio signal 142 and generates the sound 162 corresponding to the pre-compensated audio signal 142 via one or more speakers via a playback operation. As the sound 162 travels the acoustic path 152 to reach the user 102, the pre-compensation at least partially offsets distortion caused along the acoustic path 152 so that resulting sound received by the user 102 has improved quality as compared to if the audio playback signal 134 were played out of the second device 106 without pre-compensation.

In response to the user 102 (and the device 104) moving away from the position 180 while the audio playback is ongoing, the device 104 repeats the process by determining the new position of the device 104 based on the position data 122 and generating a new compensation filter associated with the new position no compensation filter associated with the new position is already available for use. The device 104 adjusts the audio playback signal 134 using the new compensation filter to generate the pre-compensated audio signal 142 to at least partially compensate for distortions corresponding to the acoustic path between the second device 106 and the new position, such as described further with reference to FIG. 5.

By using the position-based compensation filter generator 130 to calibrate the audio playback, the device 104 can at least partially compensate for distortion due to room geometry, materials, and furniture and also distortion due to non-ideal performance of components in the second device 106 without requiring the manual calibration or user input that is used for calibration of conventional systems. Compensation is specific to the position of the device 104 and is updated when the device 104 moves within the acoustic environment.

Figure 2:
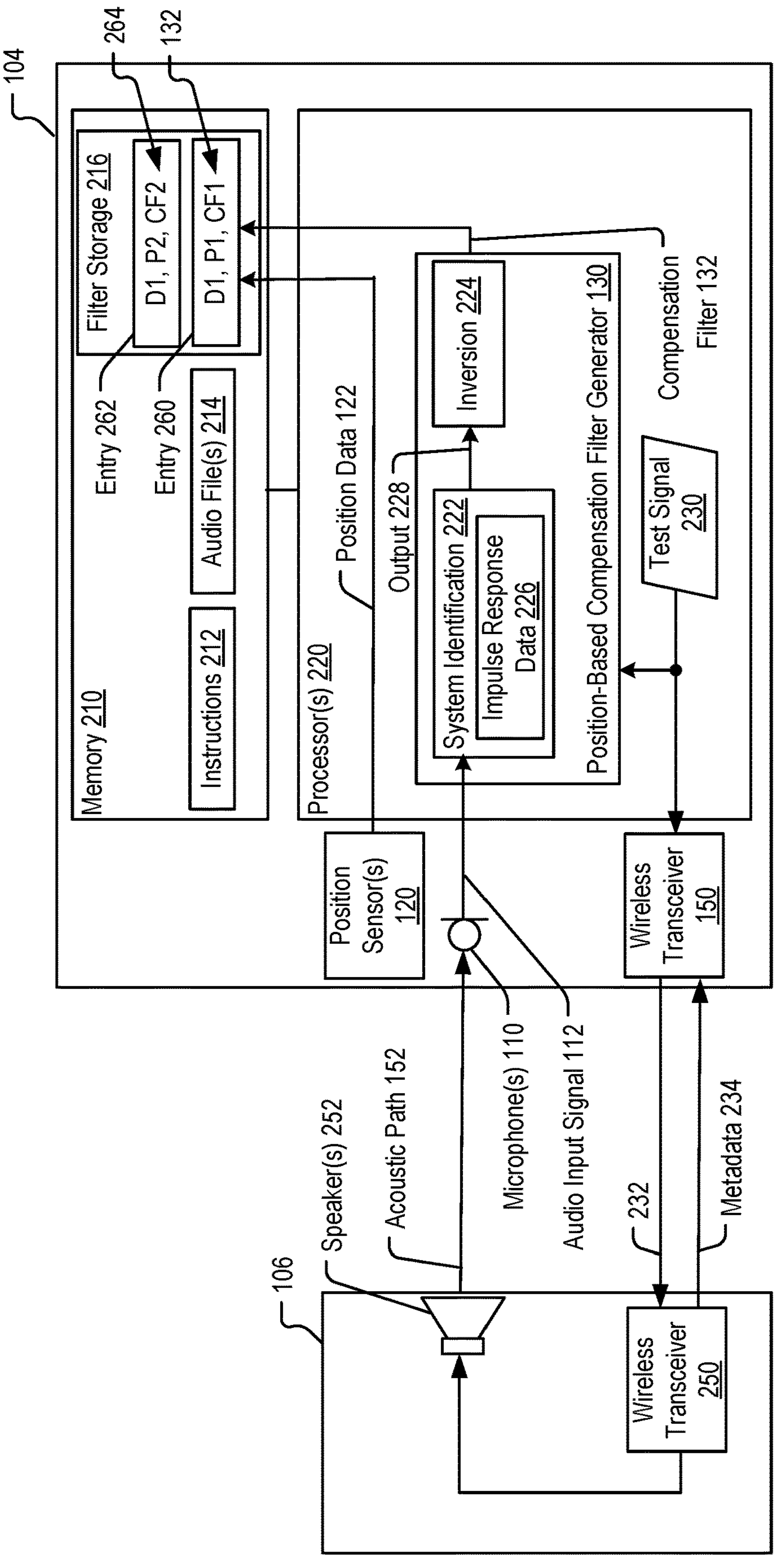
FIG. 2 is a diagram of a particular implementation of components of the system of FIG. 1 during an acquisition phase, in accordance with some examples of the present disclosure.

FIG. 2 depicts a particular implementation of components and operation of the device 104 and the second device 106 during an acquisition operation. The device 104 includes one or more processors 220 coupled to a memory 210, in addition to the one or more position sensors 120 and the wireless transceiver 150 of FIG. 1. The second device 106 includes a wireless transceiver 250 (e.g., a wireless transmitter, a wireless receiver, or both) coupled to one or more speakers 252.

The memory 210 includes instructions 212, one or more audio files 214, and a filter storage 216. The instructions 212 are executable by the one or more processors 220 to perform one or more operations or functions attributed to the one or more processors 220, as described below. The one or more audio files 214 include audio data corresponding to audio content that can be selected by a user of the device 104 for playback. In an example, the one or more audio files 214 include audio data corresponding to the audio playback signal 134 of FIG. 1. In a particular implementation, the one or more audio files 214 include audio data corresponding to a test signal 230 that is used during the acquisition operation, as described further below.

The one or more processors 220 are configured to receive the audio input signal 112 corresponding to sound received from the second device 106. For example, in some implementations the audio input signal 112 corresponds to a multi-channel analog or digital signal that is received at an audio interface of the one or more processors 220, such as an audio bus interface. Receiving the audio input signal 112 may include performing analog-to-digital conversion or other processing, such as described further with reference to FIG. 11.

The one or more processors 220 are configured to determine the position data 122 indicative of a position of the device 104. In some implementations, the one or more processors 220 receive sensor data from the one or more position sensors 120 and process the sensor data to generate the position data 122, such as performing a multi-microphone direction of arrival analysis, updating position and movement estimates based on motion sensor data, or processing camera data (e.g., structured light images) to determine a distance and orientation of the device 104 relative to a reference, as illustrative, non-limiting examples. In some implementations, the one or more processors 220 perform coordinate transformation or other processing to combine or "fuse" position estimates from multiple different types of position sensors, such as to reconcile absolute position data (e.g., satellite-based positioning data) with relative position data (e.g., acoustic position sensing). In other implementations, the one or more position sensors 120 include on-board signal processing and output the position data 122 without requiring additional processing by the one or more processors 220, and the position data 122 is determined via receipt of the position data 122 by the one or more processors 220.

The one or more processors 220 are configured to generate, based on the audio input signal 112, the compensation filter 132 to be applied to an audio playback signal to at least partially compensate for distortion associated with sound propagation from the second device 106 to the position of the device 104. For example, the wireless transceiver 150 is configured to transmit the test signal 230 to the second device 106. The test signal 230 can include a dedicated audio signal, such as a sweep, noise, music, or other audio content, that is streamed from the device 104 to the second device 106 via a wireless transmission 232. In some implementations, an automatic calibration procedure is performed as the device 104 streams unknown music or movie content as the test signal 230. Because the device 104 has access to the raw audio content via loopback, audio content of the test signal 230 that is unknown prior to playback by the second device 106 is supervised during playback for use in determining the compensation filter 132.

The one or more microphones 110 are configured to receive, from the second device 106, sound corresponding to playout of the test signal 230 from the second device 106 and to generate the audio input signal 112 representative of the received sound corresponding to playout of the test signal 230. The one or more processors 220 are configured to perform a system identification operation 222 to generate impulse response data 226 based on the audio input signal 112 and the test signal 230 and to perform an inversion operation 224 based on an output 228 of the system identification operation 222 to generate the compensation filter 132. In some implementations, the device 104 performs system identification using a normalized least mean squares adaptive filter (e.g., single-channel or multi-channel, and single-band or multi-band) from which a room impulse response (RIR) is determined once the filters have converged (e.g., after a few seconds). In some implementations, the room impulse response is used to automatically obtain a compensation filter using a weighted least squares (WLS) approach in which an "ideal" Dirac delta is used as the desired response. Further regularization and weighting may be performed to mitigate sharp peaks that may otherwise appear in the resulting compensation filter (also referred to as a playback equalization filter).

Figure 3:
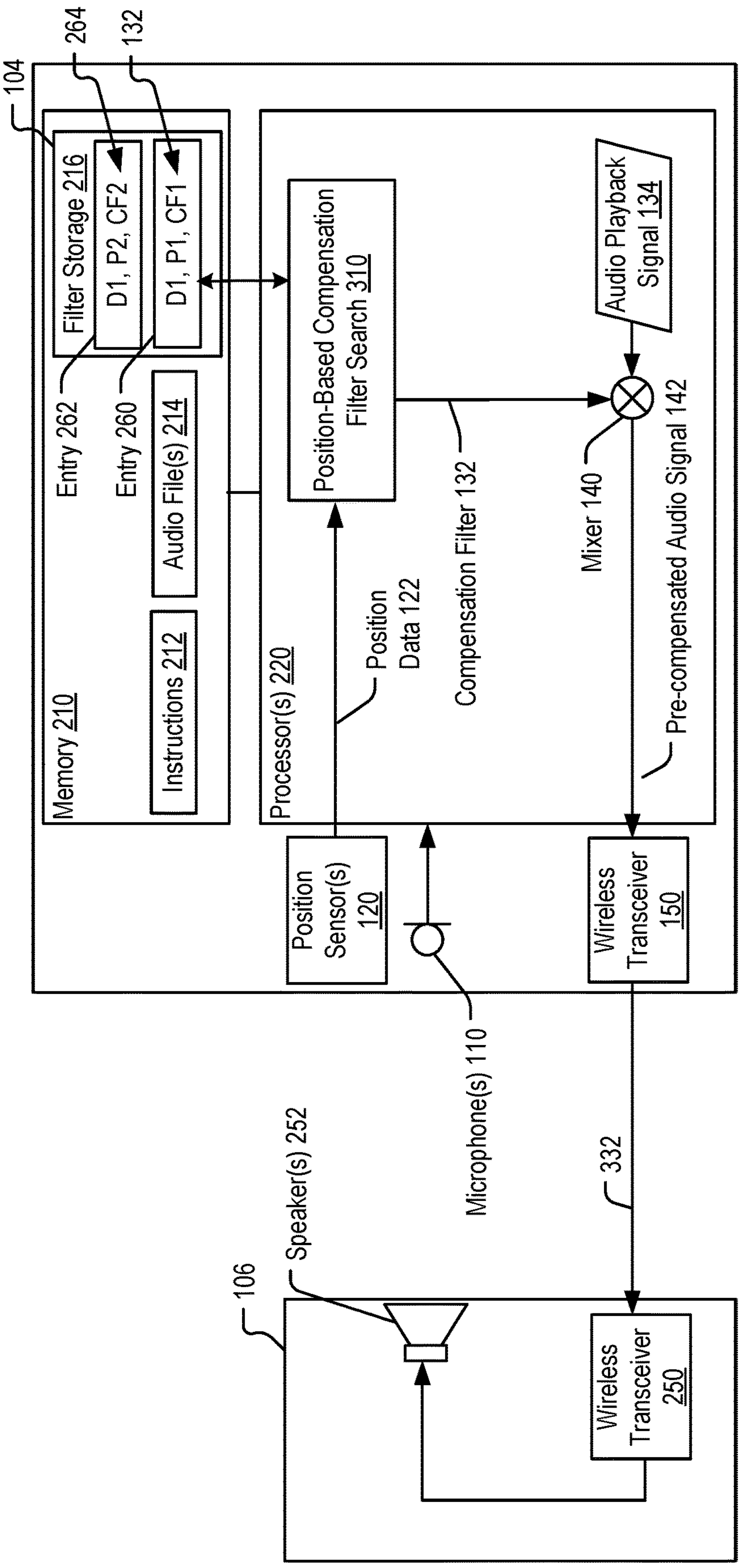
FIG. 3 is a diagram of particular implementation of components of the system of FIG. 1 during a playback phase, in accordance with some examples of the present disclosure.
Figure 5:
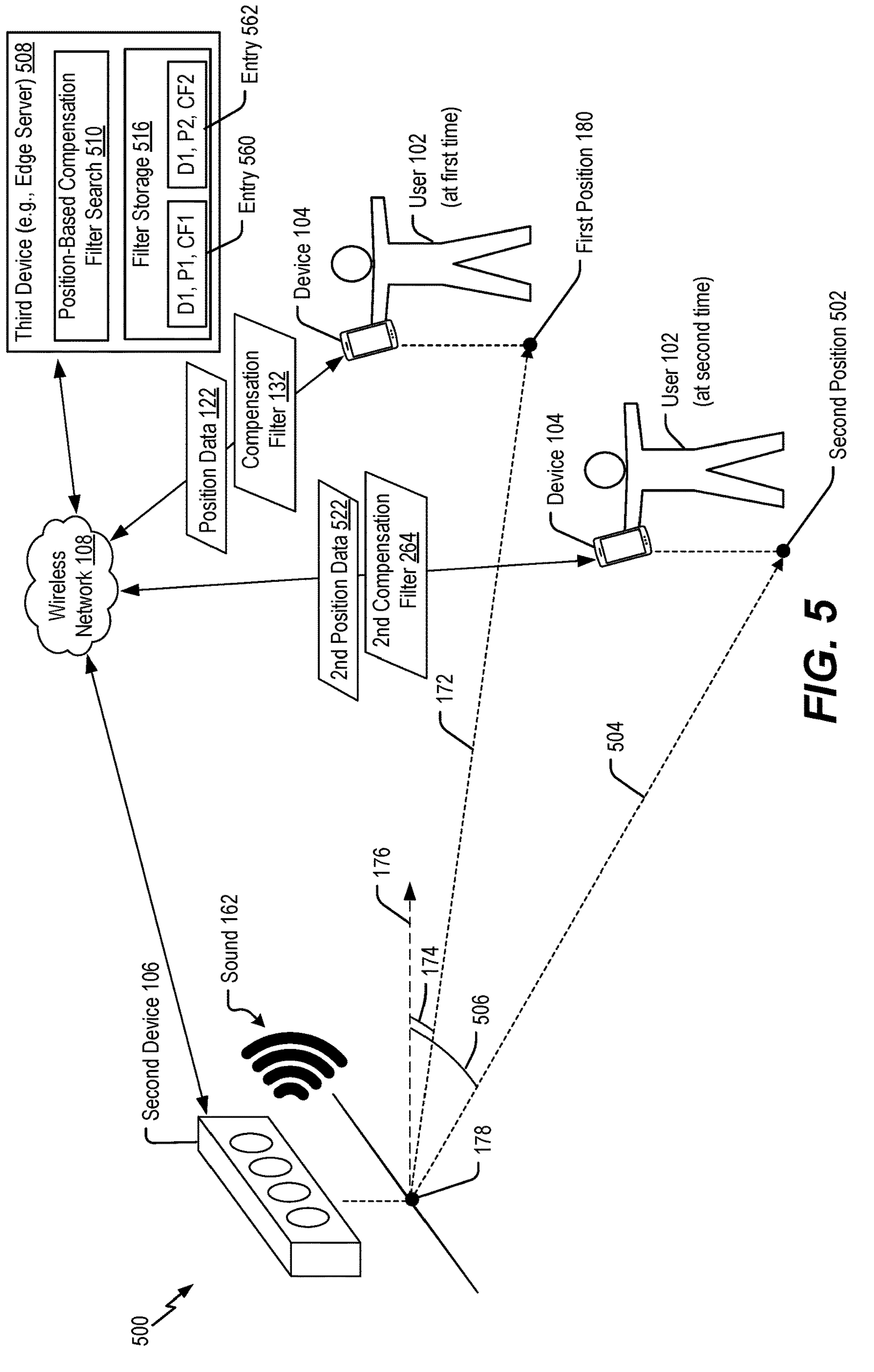
FIG. 5 is a diagram of particular implementation of a system including the device of FIG. 1 and showing location-based audio signal compensation at multiple locations of the device, in accordance with some examples of the present disclosure.

The one or more processors 220 are configured to store the compensation filter 132 in association with the position data 122 in the filter storage 216 to enable retrieval of the compensation filter 132 responsive to a position-based compensation filter search, such as described further with reference to FIG. 3 and FIG. 5. As illustrated, the one or more processors 220 store an entry 260 to the filter storage 216 that includes an indication of the second device 106 ("D1"), the position data 122 ("P1"), and data representing the compensation filter 132 ("CF1").

During operation, the device 104 and the second device 106 establish a wireless connection (e.g., via a Wi-Fi or Bluetooth network). The device 104 receives metadata 234 from the second device 106. For example, the metadata 234 can include a unique or semi-unique identifier of the second device 106 and may further include information, such as data indicating a position of the device 104 as determined by one or more cameras or other sensors of the second device 106.

The one or more processors 220 search the filter storage 216 for a compensation filter that is for the second device 106 and that corresponds to the position indicated by the position data 122. In response to determining that the filter storage 216 does not include an appropriate filter, the one or more processors 220 initiate execution of the acquisition operation.

During the acquisition operation, the test signal 230 is streamed to the second device 106 via the transmission 232. The test signal 230 is received at the wireless transceiver 250 and played out as test sound at the one or more speakers 252 of the second device 106. The test sound may be distorted due to imperfect performance of one or more components within the second device 106 and may be further distorted during propagation along the acoustic path 152 prior to being received at the one or more microphones 110. The audio input signal 112 corresponding to the received test sound is generated by the one or more microphones 110 and provided to the one or more processors 220.

In the position-based compensation filter generator 130 at the one or more processors 220, the system identification operation 222 processes the audio input signal 112 and the test signal 230 to generate the output 228, and the output 228 is processed by the inversion operation 224 to generate the compensation filter 132. The compensation filter 132 is stored to the filter storage 216 via storage of the entry 260, enabling search of the filter storage 216 based on the identifier of the second device 106 and based on the position data 122. The compensation filter 132 is also used for pre-compensation for audio playback, as described further with reference to FIG. 3 and FIG. 4.

After generating the compensation filter 132, the one or more processors 220 are configured to determine second position data ("P2") indicative of a second position of the device 104 after movement of the device 104 to another location, such as when the user 102 gets up from a desk and moves to a couch while audio playback is ongoing at the second device 106. The one or more processors 220 search the filter storage 216 for a compensation filter associated with the second position. In response to determining that the filter storage 216 does not include an appropriate filter, the one or more processors 220 initiate another iteration of the acquisition operation to generate a second compensation filter 264, which may be stored to the filter storage 216 in an entry 262 that identifies the second device 106 ("D1"), the second position data ("P2"), and data corresponding to the second compensation filter 264 ("CF2"). An example of using multiple filters based on movement of the device 104 is provided with reference to FIG. 5.

Generating compensation filters based on the location of the device 104 enables at least partial compensation for distortion due to room geometry, materials, and furniture along the specific acoustic path to the device 104 and also for distortion due to non-ideal performance of components in the second device 106 without requiring the manual calibration or user input that is used for calibration of conventional systems. By using the test signal 230 to inform the position-based compensation filter generator 130 during the system identification operation 222, actual music or movie audio content can be used for calibration during normal use by the user 102 without having to play out test tones or noise signals, resulting in an improved user experience.

Although the device 104 is described as searching the filter storage 216 for an appropriate compensation filter prior to initiating generation of the compensation filter 132, in other implementations the device 104 does not search the filter storage 216 prior to generating the compensation filter 132. For example, the device 104 may be configured to automatically generate calibration filters periodically, in response to detection of movement of the device 104, in response to receiving a command from the user 102, such as via a user interface of the device 104 (e.g., a graphical user interface or voice command for the acquisition of a compensation filter, selection of a compensation filter, or both), or any combination thereof.

Although the device 104 streams the test signal 230, generates the compensation filter 132, and maintains the filter storage 216 in the memory 210, in other implementations streaming the test signal 230, generating the compensation filter 132, maintaining the filter storage, or any combination thereof, may be performed by another device that is in communication with the device 104, with the second device 106, or both, such as an edge server or a cloud server. An example of filter storage using an external device is provided with reference to FIG. 5.

FIG. 3 depicts a particular implementation of components and operation of the device 104 and the second device 106 during a playback phase. For example, the playback phase may occur after one or both of the acquisition operations described in FIG. 2, during which the compensation filter 132 and the second compensation filter 264 were generated and stored in the filter storage 216 as the entry 260 and the entry 262, respectively.

In the playback phase, the one or more processors 220 apply the appropriate compensation filter, such as the compensation filter 132, to the audio playback signal 134 to generate the pre-compensated audio signal 142. For example, the mixer 140 convolves the audio playback signal 134 with the compensation filter 132 to generate the pre-compensated audio signal 142. The pre-compensated audio signal 142 is transmitted to the second device 106 via a transmission 332 (e.g., streaming audio). The second device 106 plays out the pre-compensated audio signal 142 via the one or more speakers 252, as described in FIG. 1.

The one or more processors 220 are also configured to perform a position-based compensation filter search 310. For example, when the position data 122 indicates that the device 104 has moved to the first position ("P1"), the one or more processors 220 may perform a table lookup operation using the identifier of the second device 106 ("D1") and the first position ("P1") as indices to the lookup operation to determine whether any entry in the filter storage 216 includes an appropriate filter. In other implementations, the entries in the filter storage 216 are arranged or managed as a database, a list, an array, or one or more other data structures, and the position-based compensation filter search 310 is configured to access the device identifiers and positions of entries in the filter storage 216 for comparison to the search criteria (e.g., device identifier and position).

In some implementations, the position-based compensation filter search 310 uses a distance threshold to identify whether a compensation filter is appropriate for the present position of the device 104. In an example, the position-based compensation filter search 310 locates the entry in the filter storage 216 that has the closest associated position to the position of the device 104. If a distance between a position associated with a stored compensation filter and the position of the device 104 is less than the distance threshold, then the compensation filter associated with the located entry is used. Otherwise, a new compensation filter is generated using the acquisition operation of FIG. 2. Alternatively, in another example, the new compensation filter is generated based on a combination of two or more other compensation filters, as described further with reference to FIG. 7.

Figure 4:
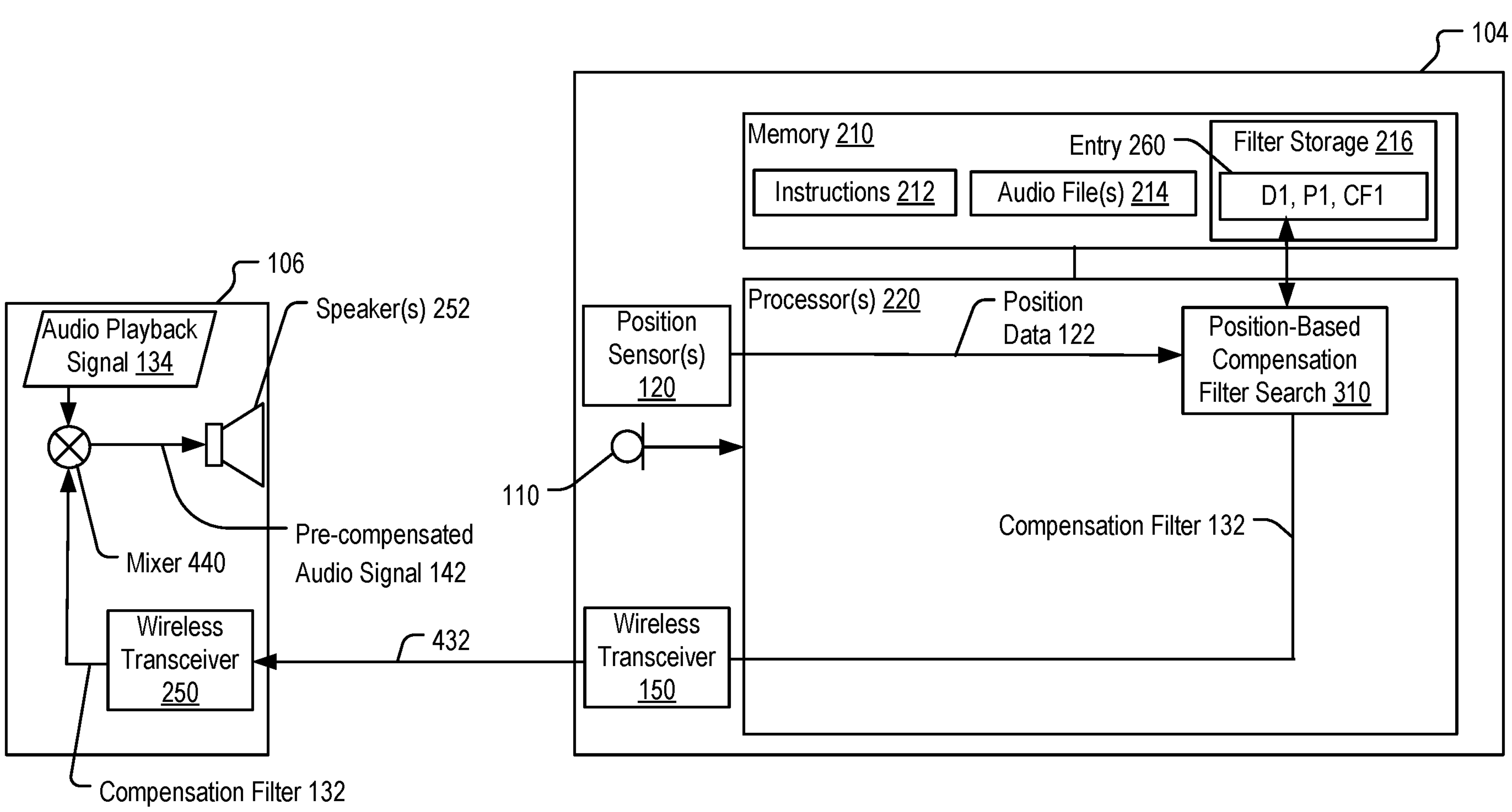
FIG. 4 is a diagram of another particular implementation of components of the system of FIG. 1 during a playback phase, in accordance with some examples of the present disclosure.

FIG. 4 is a diagram of another particular implementation of components of the system of FIG. 1 during a playback phase, in accordance with some examples of the present disclosure. In the implementation depicted in FIG. 4, the audio playback signal 134 is stored (or received) at the second device 106 rather than at the device 104. The compensation filter 132 that is identified by the position-based compensation filter search 310 (or generated by the acquisition operation of FIG. 2) is sent to the second device 106 via a transmission 432.

The second device 106 receives the compensation filter 132 and applies the compensation filter 132 to the audio playback signal 134, such as via convolution at a mixer 440, to generate the pre-compensated audio signal 142. The pre-compensated audio signal 142 is played out via the one or more speakers 252.

FIG. 5 is a diagram of particular implementation of a system 500 that includes the first device 104, the second device 106, and a third device 508 coupled to the wireless network 108. In a particular example, the third device 508 corresponds to an edge server or a cloud server. The third device 508 includes a filter storage 516 and is configured to perform a position-based compensation filter search 510 of the filter storage 516 in a similar manner as described with reference to the filter storage 216 and the position-based compensation filter search 310.

As illustrated, the user 102 may operate the device 104 at the position 180 (also referred to as "first position" 180) at a first time and may later change locations so that the device 104 is at a second position 502 at a second time that is after the first time. The second position 502 is located at a second distance 504 from the reference position 178 and at a second offset angle 506 from the reference direction 176.

At the first position 180, the device 104 transmits the position data 122 indicating the position 180 to the third device 508. In some examples, the device 104 includes a local filter storage (e.g., the filter storage 216) and sends the position data 122 to the third device 508 to search for an appropriate compensation filter when a local filter-based compensation filter search (e.g., the position-based compensation filter search 310 of FIG. 3) does not identify any locally stored compensation filter. In other examples, the device 104 is not configured to maintain a local filter storage.

In response to receiving the position data 122, the third device 508 performs the position-based compensation filter search 510 to locate an entry 560 associated with the second device 106 ("D1") and the position data 122 ("P1"), and sends the compensation filter 132 to the device 104 for use in generating the pre-compensated audio signal 142, such as in the implementation depicted in FIG. 3, which is streamed to the second device 106 to for playback as the sound 162.

After the user 102 has moved the device 104 to the second position 502, the device 104 transmits second position data 522 indicating the second position 502 to the third device 508. For example, the device 104 may determine the second position data 522 indicative of the second position 502 of the device 104 after movement of the device 104. The device 104 may not find an appropriate compensation filter in a local filter storage or may not be configured to maintain a local filter storage. In response to receiving the second position data 522, the third device 508 performs the position-based compensation filter search 510 to locate an entry 562 associated with the second device 106 ("D1") and the second position data 522 ("P2") and sends the second compensation filter 264 to the device 104. The device 104 replaces the compensation filter 132 with the second compensation filter 264 and continues streaming of the pre-compensated audio signal. However, after replacement of the compensation filter 132 with the second compensation filter 264, the pre-compensated audio signal is adjusted to compensate for distortion in the sound 162 received at the second position 502 rather than to compensate for distortion at the position 180.

In the event that the filter storage 516 does not include an appropriate compensation filter, the third device 508 may send a notification to the device 104 that causes the device 104 to initiate an acquisition operation as described in FIG. 2. For example, if the filter storage 516 does not include the entry 560 corresponding to the first position 180 ("P1"), the device 104 generates the compensation filter 132 and sends the compensation filter 132 and the position data 122 to the third device 508 to enable later retrieval of the compensation filter 132 responsive to a position-based compensation filter search 510 at the third device 508.

Although the third device 508 sends the compensation filter 132 and the second compensation filter 264 to the device 104, in other implementations the third device 508 instead sends the compensation filter 132 and the second compensation filter 264 to the second device 106, such as when the second device 106 is operable to apply the compensation filters to generate a pre-compensated audio signal, as described in FIG. 4.

Figures 6, 7:
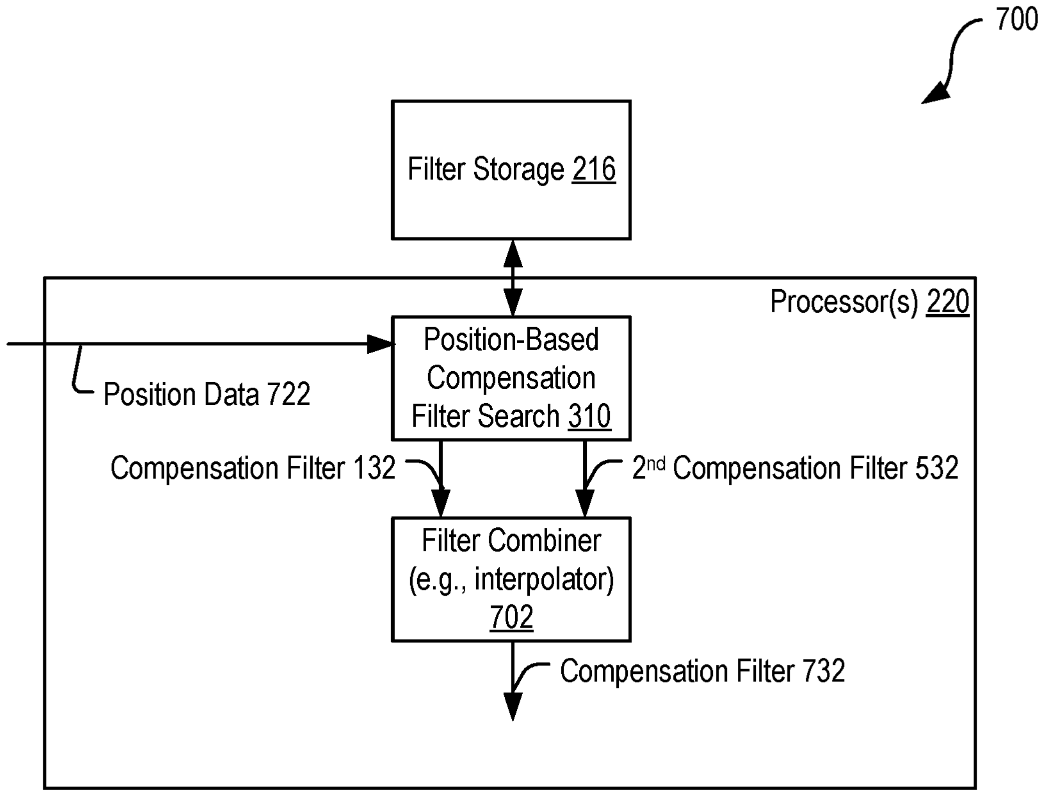
FIG. 6 is a diagram of a particular implementation of a memory structure that can be used to store location-based compensation filters accessible to the device of FIG. 1, in accordance with some examples of the present disclosure.
FIG. 7 is a diagram of a particular implementation of components that can be included in the device of FIG. 1, in accordance with some examples of the present disclosure.

FIG. 6 is a diagram of a particular implementation of a memory structure 600 that can be used to store location-based compensation filters. For example, the memory structure 600 can correspond to the filter storage 216, the filter storage 516, or a combination thereof. The memory structure 600 has a first column 602 that contains an entry index (Entry), a second column 604 that contains device identifiers (Device ID), a third column 606 that includes position information (Position), and a fourth column 608 that includes filter data (Filter). Each row of the memory structure 600 corresponds to a separate entry, such as the entry 260 and the entry 262 of FIG. 2 or the entry 560 and the entry 562 of FIG. 5.

A first entry 612 has index 1, device identifier 01 (e.g., the second device 106), position $[x_1, y_1, z_1]$ (e.g., the position of the device 104 is expressed as coordinates in a three-dimensional rectangular coordinate system), and filter data $h_1(n)$ (e.g., a set of filter coefficient values or "taps"). A second entry 614 has index 2, device identifier 01, position $[x_2, y_2, z_2]$, and filter data $h_2(n)$. A third entry 616 has index 3, device identifier 02 (e.g., a playback device other than the second device 106), position $[x_3, y_3, z_3]$, and filter data $h_3(n)$. An Nth entry 618 (where N is an integer greater than 3) has index N, device identifier 01, position $[x_N, y_N, z_N]$, and filter data $h_N(n)$.

In some implementations, the entries 612-618 are sorted, such as based on position, to reduce latency associated with a position-based compensation filter search. As an illustrative, non-limiting example, the memory structure 600 may be sorted first on device ID, and the entries for each device ID are sorted based on position, such as by the x-coordinate of each entry.

FIG. 7 depicts an example of an implementation 700 in which the one or more processors 220 are operable to generate a compensation filter 732 based on a combination of multiple stored filters. In response to the position-based compensation filter search 310 failing to find an appropriate compensation filter in the filter storage 216 for particular position data 722 (e.g., the nearest position associated with a stored compensation filter is greater than a threshold distance from the position associated with the position data 722), the position-based compensation filter search 310 retrieves multiple compensation filters, illustrated as the compensation filter 132 and the second compensation filter 532. For example, the position-based compensation filter search 310 may identify the compensation filter 132 and the second compensation filter 532 as the two compensation filters in the filter storage 216 whose associated positions are closest to the position indicated the position data 722.

The compensation filter 132 and the second compensation filter 532 are provided to a filter combiner 702, which is configured to generate a compensation filter 732 based on a combination of two or more other compensation filters. In a particular implementation, the filter combiner 702 is configured to perform an interpolation of the received compensation filters, such as a linear interpolation, polynomial interpolation, or spline interpolation, as illustrative, non-limiting examples. In some implementations, the filter combiner 702 is configured to perform filter prediction based on stored compensation filters. To illustrate, the filter combiner 702 may generate a model of filter parameters for the acoustic space and estimate the compensation filter 732 based on the model.

The device 104 may therefore use compensation filters for the same playback device (e.g., the second device 106) at multiple listening positions to predict response at unmeasured points in the acoustic environment. In some implementations, one or multiple users may generate compensation filters for the same playback device using a variety of personal devices (e.g., different versions of the device 104) at the same listening position (or at listening positions in close proximity to each other). The filter combiner 702 can average multiple compensation filters to mitigate device-specific acoustic characteristics that are introduced by the variety of personal devices.

Although FIG. 7 depicts using the filter combiner 702 to generate the compensation filter 732, in other implementations the one or more processors 220 do not combine multiple filters. For example, in some implementations the closest match compensation filter in the filter storage 216 is selected for use, irrespective of the distance between the position of the device 104 and the position associated with the closest match compensation filter. In other implementations, continuous filter generation through adaptive filtering may be used.

Figure 8A:
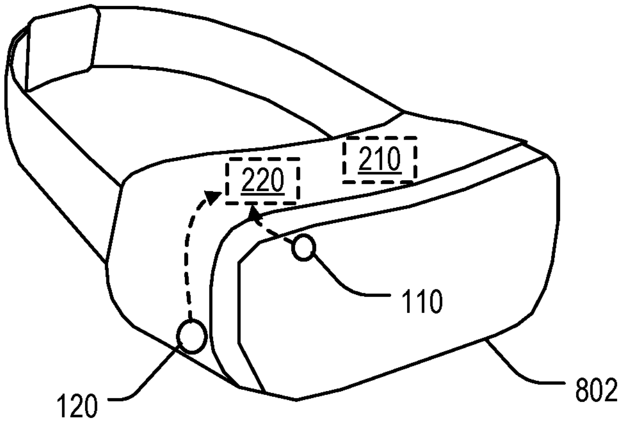
FIG. 8A is a diagram of a particular implementation of a wearable electronic device operable to perform location-based audio signal compensation, in accordance with some examples of the present disclosure.
Figure 8B:
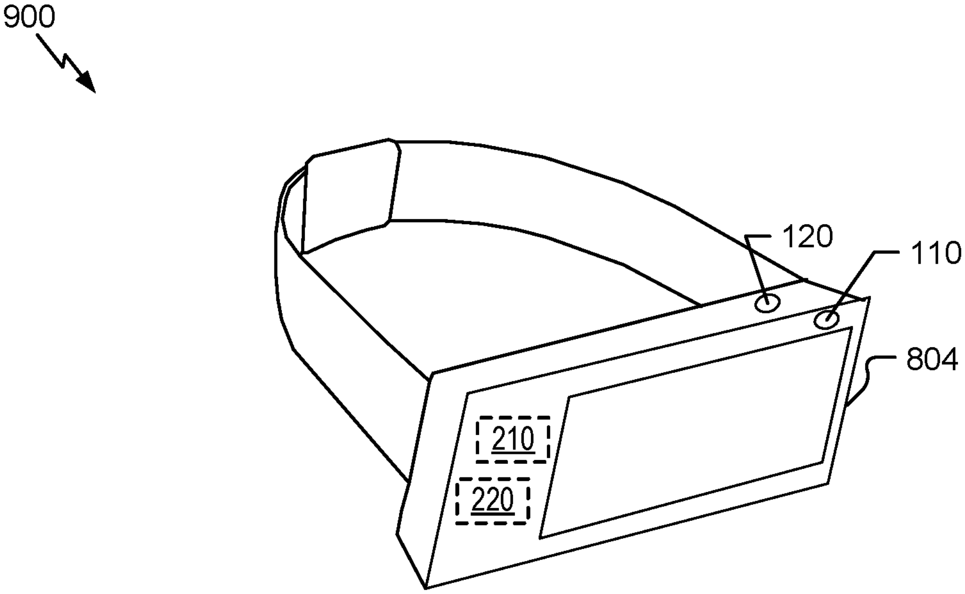
FIG. 8B is a diagram of another particular implementation of a wearable electronic device operable to perform location-based audio signal compensation, in accordance with some examples of the present disclosure.

FIGS. 8A and 8B depict examples in which the device 104 is implemented as wearable electronic devices. In FIG. 8A, the one or more microphones 110, the one or more position sensors 120, the memory 210, and the one or more processors 220 are implemented into a virtual reality (VR) or augmented reality (AR) headset device 802. The memory 210 and the one or more processors 220 are illustrated in dashed lines to indicate that these components may be internal components that may not be visible form an exterior of the device 104. In FIG. 8B, the one or more microphones 110, the one or more position sensors 120, the memory 210, and the one or more processors 220 are implemented into a "smart watch" device 804.

Figure 9:
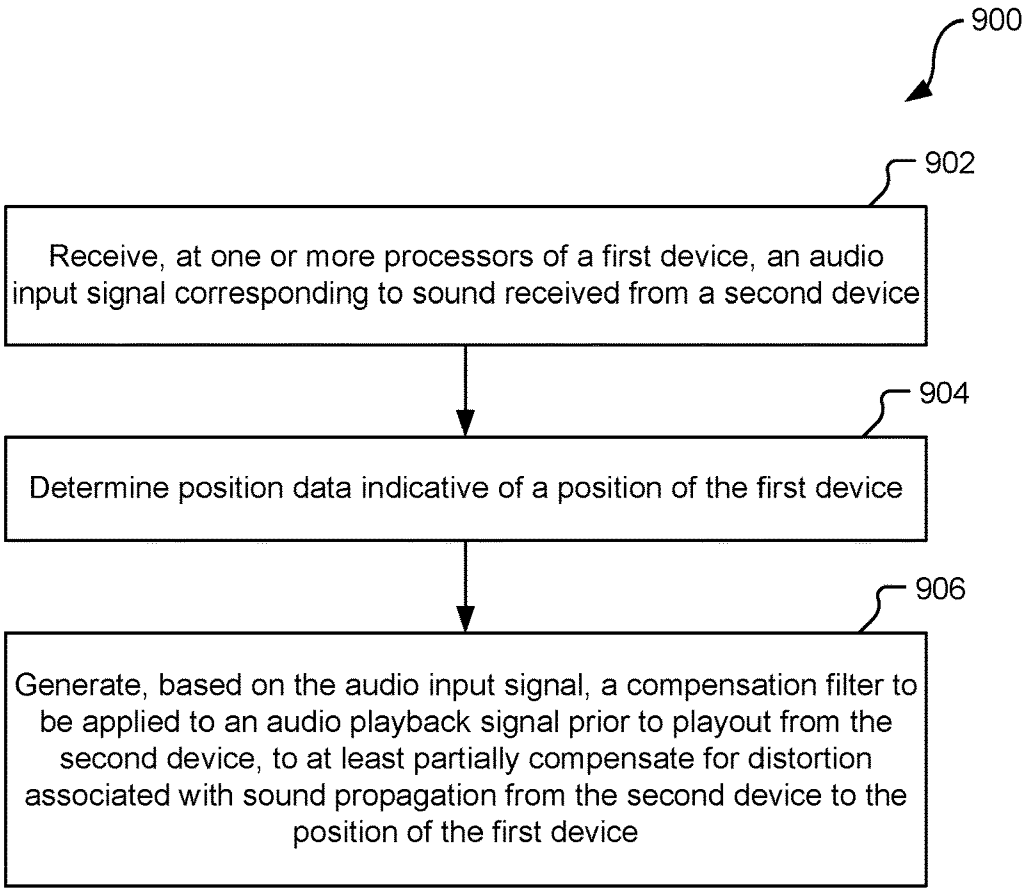
FIG. 9 is diagram of a particular implementation of a method of location-based audio signal compensation that may be performed by the device of FIG. 1, in accordance with some examples of the present disclosure.

Referring to FIG. 9, a particular implementation of a method 900 of performing location-based audio signal compensation is depicted that may be performed by the device 104 of FIG. 1, the headset device 802 of FIG. 8A, the smart watch device 804 of FIG. 8B, one or more other devices, or any combination thereof.

The method 900 includes receiving, at one or more processors of a first device, an audio input signal corresponding to sound received from a second device, at 902. For example, in some implementations the method 900 includes wirelessly transmitting a test signal from the first device to the second device and receiving the sound from the second device, the sound corresponding to playout of the test signal from the second device, such as described with reference to the test signal 230 of FIG. 2. The audio input signal may be generated at a microphone of the first device responsive to receiving the sound, such as the audio input signal 112 generated at the one or more microphones 110 in response to receiving the sound 162.

The method 900 includes determining position data indicative of a position of the first device, at 904. In some examples, the position data is determined based on at least one of: acoustic position sensing, millimeter wave-based sensing, ultrasonic sensing, satellite-based positioning, camera-based tracking from the second device, or any combination thereof, such as descried with reference to the one or more position sensors 120.

The method 900 includes generating, based on the audio input signal, a compensation filter to be applied to an audio playback signal prior to playout from the second device, to at least partially compensate for distortion associated with sound propagation from the second device to the position of the first device, at 906. In some examples, generating the compensation filter includes performing a system identification operation, such as the system identification operation 222 of FIG. 2, to generate impulse response data based on the audio input signal and the test signal and performing an inversion operation, such as the inversion operation 224 of FIG. 2, based on a result of the system identification operation.

For example, in some implementations the method 900 includes applying the compensation filter 132 to the audio playback signal 134, at the first device 104, to generate the pre-compensated audio signal 142, sending the pre-compensated audio signal 142 from the first device 104 to the second device 106 for playout, such as depicted in FIG. 3. In other implementations, the method 900 includes sending the compensation filter 132 to the second device 106, such as depicted in FIG. 4, so that the compensation filter 132 can be applied at the second device 106 prior to playback of the audio playback signal 134.

In some implementations, the method 900 includes storing the compensation filter at a filter storage of the first device in association with the position data to enable retrieval of the compensation filter responsive to a position-based compensation filter search, such as in the entry 260 at the filter storage 216 to be retrievable based on the position-based compensation filter search 310. In other implementations, the method 900 includes sending the compensation filter and the position data to a third device to enable retrieval of the compensation filter responsive to a position-based compensation filter search at the third device, such as described with reference to the third device 508 of FIG. 5. In some examples, the method 900 includes determining second position data indicative of a second position of the first device after movement of the first device, such as the second position data "P2" of FIG. 3, and searching the filter storage for a second compensation filter associated with the second position, such as the second compensation filter "CF2" 332 in the entry 362 of FIG. 3.

In some implementations, the method 900 includes generating the second compensation filter based on a combination of multiple stored filters, such as described for the compensation filter 732 generated by the filter combiner 702 of FIG. 7. In other implementations, the compensation filter in the filter storage that is associated with the closest position to the second position data is selected. In some examples, if a distance between the device position and the closest position associated with a compensation filter in the filter storage exceeds a distance threshold, a filter acquisition operation is performed to generate a compensation filter for that position, such as described with reference to FIG. 2.

By generating the compensation filter based on the sound received at the location of the first device, the method 900 enables calibration of the second device's audio playback based on output sound that is received at the first device's microphones and to least partially compensate for distortion at the location of the first device, such as distortion due to room geometry, materials, and furniture and also distortion due to non-ideal performance of components in the second device. For example, the location-based compensation may enable a sound quality associated with relatively expensive audio components to be provided using lower-cost components in the second device, and speech intelligibility may be improved though reverberation reduction. The method 900 enables location-based distortion compensation without requiring the manual calibration that is used for calibration of conventional systems. Music or movie audio content can be used for calibration during normal use without playing out test tones or noise signals, resulting in an improved user experience.

The method 900 of FIG. 9 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 900 of FIG. 9 may be performed by a processor that executes instructions, such as described with reference to the one or more processors 220.

Figure 10:
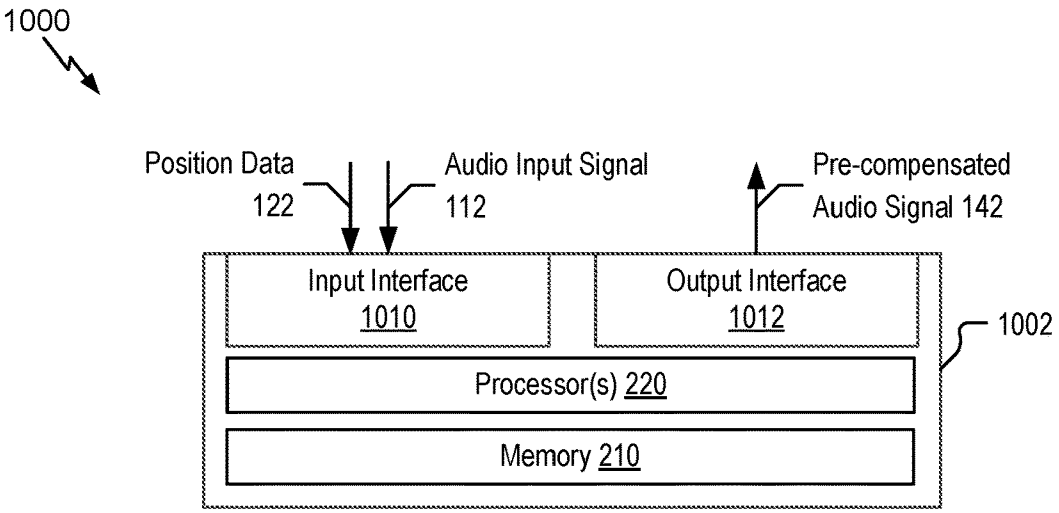
FIG. 10 is a block diagram of another particular implementation of a device that is operable to perform location-based audio signal compensation, in accordance with some examples of the present disclosure.
Figure 11:
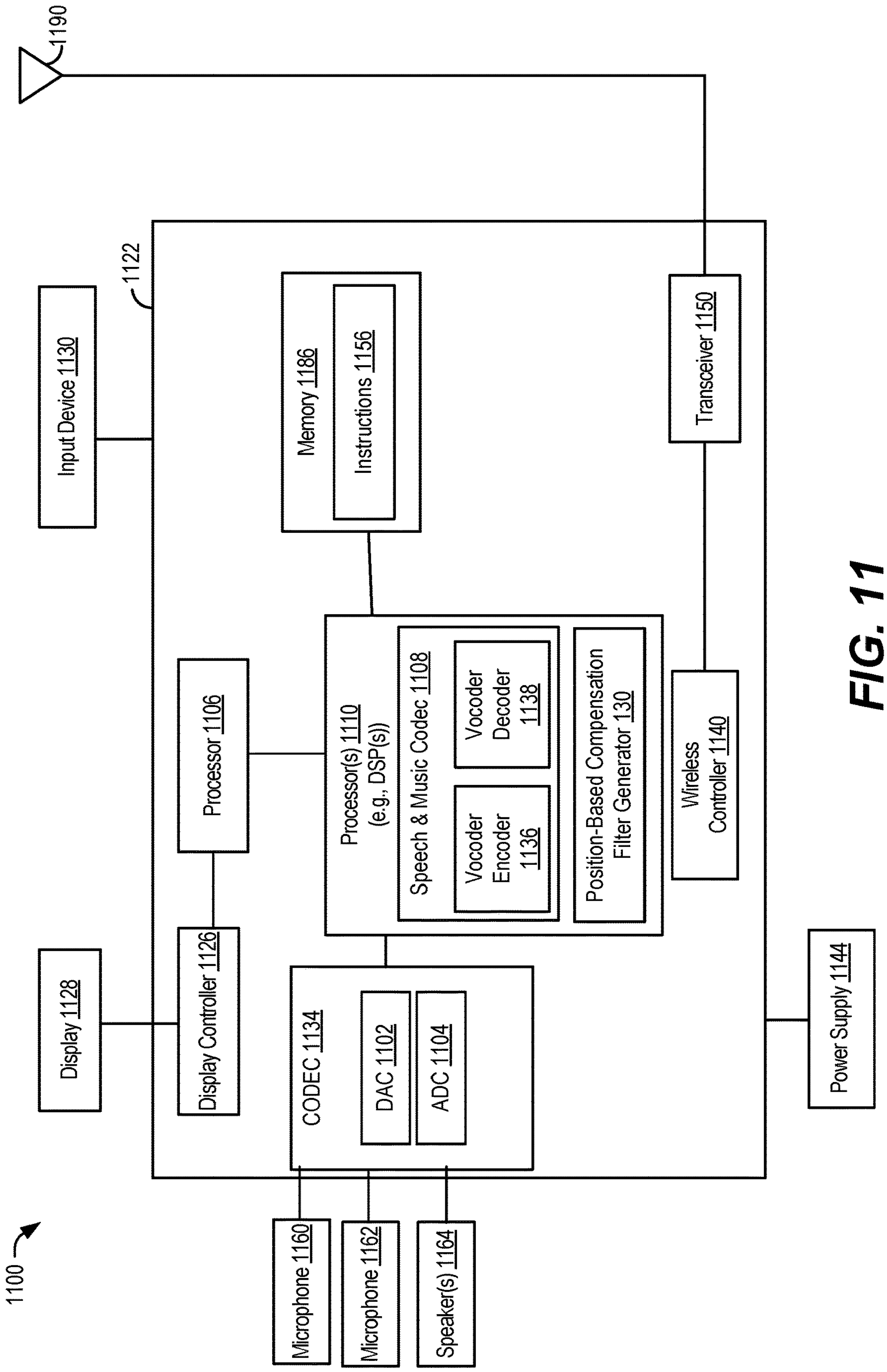
FIG. 11 is a block diagram of another particular illustrative example of a device that is operable to perform location-based audio signal compensation, in accordance with some examples of the present disclosure.

FIG. 10 depicts an implementation 1000 of a device 1002 that includes the memory 210 and the processors 220 integrated in a discrete component, such as a semiconductor chip or package as described further with reference to FIG. 11. The device 1002 includes an input interface 1010, such as a first bus interface, to enable the audio input signal 112 and the position data 122 to be received from one or more microphones, one or more position sensors, or other components external to the device 1002, such as the one or more microphones 110 and the one or more position sensors 120. The device 1002 also includes an output interface 1012, such as a second bus interface, to enable sending of the pre-compensated audio signal 142 (or the compensation filter 132) to an external playback device, such as via the wireless transceiver 150. The device 1002 enables implementation of location-based audio signal compensation as a component in a system that includes one or more microphones, one or more position sensors, and an external playback device, such as in a wearable electronic device as depicted in FIG. 8A and FIG. 8B or in a wireless communication device as depicted in FIG. 11, as illustrative, non-limiting examples.

Referring to FIG. 11, a block diagram of a particular illustrative implementation of a device is depicted and generally designated 1100. In various implementations, the device 1100 may have more or fewer components than illustrated in FIG. 11. In an illustrative implementation, the device 1100 may correspond to the device 104. In an illustrative implementation, the device 1100 may perform one or more operations described with reference to FIGS. 1-10.

In a particular implementation, the device 1100 includes a processor 1106 (e.g., a central processing unit (CPU)). The device 1100 may include one or more additional processors 1110 (e.g., one or more DSPs). The processors 1110 may include a speech and music coder-decoder (CODEC) 1108 and the position-based compensation filter generator 130. For example, the processors 1110, the processor 1106, or a combination thereof, may correspond to the one or more processors 220 of FIG. 2. The speech and music codec 1108 may include a voice coder ("vocoder") encoder 1136, a vocoder decoder 1138, or both.

The device 1100 may include a memory 1186 and a CODEC 1134. The memory 1186 may correspond to the memory 210 and may include instructions 1156, such as the instructions 212 of FIG. 2, that are executable by the one or more additional processors 1110 (or the processor 1106) to implement the functionality described with reference to the position-based compensation filter generator 130. The device 1100 may include a wireless controller 1140 coupled, via a transceiver 1150, to an antenna 1190.

The device 1100 may include a display 1128 coupled to a display controller 1126. A first microphone 1160 and a second microphone 1162 may correspond to the one or more microphones 110 and may be coupled, along with one or more speakers 1164, to the CODEC 1134. The CODEC 1134 may include a digital-to-analog converter 1102 and an analog-to-digital converter 1104. In a particular implementation, the CODEC 1134 may receive analog signals from the microphones 1160, 1162, convert the analog signals to digital signals using the analog-to-digital converter 1104, and provide the digital signals to the speech and music codec 1108. The speech and music codec 1108 may process the digital signals. In a particular implementation, the speech and music codec 1108 may provide digital signals to the CODEC 1134. The CODEC 1134 may convert the digital signals to analog signals using the digital-to-analog converter 1102 and may provide the analog signals to the one or more speakers 1164 for local audio playback (as opposed to playback via an external device, such as the second device 106).

In a particular implementation, the memory 1186, the processor 1106, the processors 1110, the display controller 1126, the CODEC 1134, and the wireless controller 1140 are included in a system-in-package or system-on-chip device 1122. In a particular implementation, an input device 1130 and a power supply 1144 are coupled to the system-on-chip device 1122. Moreover, in a particular implementation, as illustrated in FIG. 11, the display 1128, the input device 1130, the one or more speakers 1164, the microphones 1160, 1162, the antenna 1190, and the power supply 1144 are external to the system-on-chip device 1122. In a particular implementation, each of the display 1128, the input device 1130, the one or more speakers 1164, the microphones 1160, 1162, the antenna 1190, and the power supply 1144 may be coupled to a component of the system-on-chip device 1122, such as an interface or a controller.

The device 1100 may be implemented as an electronic device having a form factor (e.g., a size and weight) that accommodates portability such that the device 1100 is easily carried around by a user (so that a location of the device 1100 can be used to approximate a location of the user), such as a mobile communication device, a smart phone, a cellular phone, a laptop computer, a tablet, a personal digital assistant, a gaming controller, a music player, a radio, a portable digital video player, a portable digital video disc (DVD) player, a tuner, a camera, a navigation device, or any combination thereof. In other implementations, the device 1100 may be implemented having a form factor that is less accommodating to easy portability, such as a smart speaker (e.g., the processor 1106 may execute the instructions 1156 to run a voice-controlled digital assistant application), a speaker bar, a computer, a display device, a television, a gaming console, a music player, a radio, a digital video player, a digital video disc (DVD) player, a tuner, or any combination thereof.

In conjunction with the described implementations, an apparatus includes means for receiving sound from a sending device and generating an audio input signal corresponding to the sound. For example, the means for receiving sound can correspond to the one or more microphones 110, the microphone 1160, the microphone 1162, one or more other circuits or components configured to receive sound from a sending device and generate an audio input signal corresponding to the sound, or any combination thereof.

The apparatus also includes means for determining position data indicative of a position of the means for receiving sound. For example, the means for determining the position data can correspond to the one or more position sensors 120, one or more other circuits or components configured to determine position data, or any combination thereof.

The apparatus also includes means for generating, based on the audio input signal, a compensation filter to be applied to the audio playback signal prior to playout from the sending device, to at least partially compensate for distortion associated with sound propagation from the sending device to the position of the means for receiving sound. For example, the means for generating the compensation filter can correspond to the position-based compensation filter generator 130, the device 104, the one or more processors 220, the device 1002, the processor 1106, the one or more processors 1110, one or more other circuits or components configured to generate room impulse response data, or any combination thereof.

In some implementations, the apparatus also includes means for storing the compensation filter in association with the position data to enable retrieval of the compensation filter responsive to a position-based compensation filter search. For example, the means for storing the compensation filter can correspond to the filter storage 216, the memory 210, the third device 508, the filter storage 516, the memory 1186, one or more other circuits or components configured to store the compensation filter in association with the position data to enable retrieval of the compensation filter responsive to a position-based compensation filter search, or any combination thereof.

In some implementations, the apparatus includes means for applying the compensation filter to the audio signal to generate a pre-compensated audio signal. For example, the means for applying the compensation filter can correspond to the mixer 140, the one or more processors 220, the device 104, the device 1002, the processor 1106, the one or more processors 1110, one or more other circuits or components configured to apply the compensation filter to the audio signal, or any combination thereof.

In some implementations, the apparatus also includes means for transmitting the pre-compensated audio signal to the sending device for playout. For example, the means transmitting can correspond to the wireless transceiver 150, the output interface 1012, the wireless controller 1140, the transceiver 1150, the antenna 1190, one or more other circuits or components configured to transmit the pre-compensated audio signal to the sending device for playout, or any combination thereof.

In some implementations, a non-transitory computer-readable medium stores instructions for location-based audio signal compensation. The instructions, when executed by one or more processors, cause the one or more processors to receive an audio input signal corresponding to sound received from a second device, to determine position data indicative of a position of the first device, and to generate, based on the audio input signal, a compensation filter to be applied to the audio playback signal prior to playout from the second device, to at least partially compensate for distortion associated with sound propagation from the second device to the position of the first device. For example, the instructions may cause the one or more processors to execute at least a portion of the method 900 of FIG. 9.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein and is to be accorded the widest scope possible consistent with the principles and novel features as defined by the following claims.

What is claimed is:

1. A device to perform location-based audio signal compensation, the device comprising:

a memory configured to store instructions; and one or more processors configured to execute the instructions to:

receive an audio input signal corresponding to sound received from a second device;

determine a first position of the device;

generate, based on the audio input signal, a first set of coefficients of a compensation filter configured to:

be applied to an audio playback signal prior to playout from the second device, and at least partially compensate for distortion associated with sound propagation from the second device to the first position of the device;

generate:

first coefficient data that indicates the first set of coefficients; and first position data that indicates the first position of the device;

determine a second position of the device after movement of the device from the first position to the second position;

search a data structure for second coefficient data that indicates a second set of coefficients of the compensation filter corresponding to the second position; and in response to a failure to locate the second coefficient data, generate the second set of coefficients based on the first set of coefficients and based on a third set of coefficients of the compensation filter, the third set of coefficients associated with a third position that is within a threshold distance of the second position of the device.

2. The device of claim 1, wherein the one or more processors are further configured to:

generate identifier data that indicates an identifier of the second device; and initiate storage of the first coefficient data, the first position data, and the identifier data in a same entry of the data structure, wherein the data structure includes a plurality of entries sorted based on position data.

3. The device of claim 1, wherein the one or more processors are further configured to:

generate a pre-compensated audio signal based on application of the compensation filter to the audio playback signal; and send the pre-compensated audio signal to the second device for playout.

4. The device of claim 1, wherein the one or more processors are further configured to send the first coefficient data to the second device.

5. The device of claim 1, wherein:

the memory includes a filter storage; and the one or more processors are further configured to store, at the filter storage, the data structure.

6. The device of claim 1, wherein the one or more processors are further configured to initiate storage of the first coefficient data in a same entry of the data structure as the first position data, and wherein, to initiate the storage of the first coefficient data in the same entry as the first position data, the one or more processors are further configured to execute the instructions to send the first coefficient data and the first position data to a third device to enable retrieval of the first coefficient data responsive to a position-based compensation filter search at the third device, and wherein the third device includes a server.

7. The device of claim 1, further comprising:

a wireless transceiver coupled to the one or more processors and configured to transmit a test signal to the second device; and a microphone configured to:

receive the sound from the second device, the sound corresponding to playout of the test signal from the second device; and generate the audio input signal based on the received sound.

8. The device of claim 7, wherein the one or more processors are further configured to:

perform a system identification operation, wherein, to perform the system identification operation, the one or more processors are configured to execute the instructions to:

generate impulse response data based on the audio input signal and the test signal;

generate an output of the system identification operation based on the impulse response data; and generate, based on an inversion operation performed based on the output of the system identification operation, the first set of coefficients.

9. The device of claim 1, wherein the first position data is determined based on a satellite-based positioning operation.

10. The device of claim 1, wherein the memory and the one or more processors are incorporated into a portable communication device.

11. The device of claim 1, wherein the memory and the one or more processors are incorporated into a wearable electronic device.

12. The device of claim 1, wherein the first position data includes an absolute position of the device and a relative position of the device, and wherein to determine the first position data, the one or more processors are configured to execute the instructions to reconcile the absolute position with the relative position.

13. A method of performing location-based audio signal compensation, the method comprising:

receiving, at one or more processors of a first device, an audio input signal corresponding to sound received from a second device;

determining a first position of the first device;

generating, based on the audio input signal, a first set of coefficients of a compensation filter configured to:

be applied to an audio playback signal prior to playout from the second device, and at least partially compensate for distortion associated with sound propagation from the second device to the first position of the first device;

generating:

first coefficient data that indicates the first set of coefficients; and first position data that indicates the first position of the first device;

determining a second position of the first device after movement of the first device from the first position to the second position;

searching a data structure for second coefficient data that indicates a second set of coefficients of the compensation filter corresponding to the second position; and in response to a failure to locate the second coefficient data, generating the second set of coefficients based on the first set of coefficients and based on a third set of coefficients of the compensation filter, the third set of coefficients associated with a third position that is within a threshold distance of the second position of the first device.

14. The method of claim 13, wherein the data structure includes a plurality of entries, wherein the plurality of entries is sorted based on the position data, and wherein the method further comprises generating the audio input signal at a microphone of the first device responsive to receiving the sound.

15. The method of claim 13, further comprising:

generating, based on application of the compensation filter to the audio playback signal, a pre-compensated audio signal; and sending the pre-compensated audio signal from the first device to the second device for playout.

16. The method of claim 13, further comprising sending the first coefficient data to the second device.

17. The method of claim 13, further comprising:

storing the data structure at a filter storage of the first device to enable identification of the first set of coefficients responsive to a position-based compensation filter search operation performed at the filter storage;

applying the first set of coefficients to the audio playback signal;

during application of the compensation filter to the audio playback signal, obtaining third position data indicative of a third position of the first device;

obtaining, based on a position-based compensation filter search operation performed at the filter storage, a third set of coefficients, wherein the position-based compensation filter search operation is performed based on the third position; and applying the third set of coefficients of the compensation filter to the audio playback signal.

18. The method of claim 13, further comprising:

performing a satellite-based positioning operation to determine second position data that includes the second position of the first device after movement of the first device from the first position, wherein the second position includes an absolute position of the first device;

performing a search on a filter storage based on the second position; and identifying based on a result of the search, the second set of coefficients.

19. The method of claim 13, further comprising:

establishing a wireless connection between the first device and the second device;

obtaining, via the wireless connection from the second device, a device indicator that indicates the second device;

receiving, based on the device indicator, multiple stored sets of coefficients corresponding to multiple stored filters from a filter storage; and generating the second set of coefficients based on a combination of the multiple stored sets of coefficients.

20. The method of claim 13, further comprising initiating storage of the first coefficient data in a same entry of the data structure as the first position data, wherein initiating storage of the first coefficient data in the same entry of the data structure as the first position data includes sending the data structure to a third device to enable retrieval of the first coefficient data responsive to a position-based compensation filter search at the third device.

21. The method of claim 13, further comprising:

wirelessly transmitting a test signal from the first device to the second device; and receiving the sound from the second device, the sound corresponding to playout of the test signal from the second device.

22. The method of claim 21, wherein generating the first set of coefficients includes:

performing a system identification operation to generate impulse response data based on the audio input signal and the test signal; and performing an inversion operation based on a result of the system identification operation.

23. The method of claim 13, wherein the first position data is determined based on at least one of an acoustic position sensing operation, a millimeter wave-based sensing operation, an ultrasonic sensing operation, a satellite-based positioning operation, camera-based tracking information received from the second device, or any combination thereof.

24. A non-transitory, computer-readable medium storing instructions for location-based audio signal compensation, the instructions, when executed by one or more processors of a first device, cause the one or more processors to:

receive an audio input signal corresponding to sound received from a second device;

determine a first position of the first device;

generate, based on the audio input signal, a first set of coefficients of a compensation filter configured to:

be applied to an audio playback signal prior to playout from the second device, and at least partially compensate for distortion associated with sound propagation from the second device to the first position of the first device;

generate:

first coefficient data that indicates the first set of coefficients; and first position data that indicates the first position of the first device;

determine a second position of the first device after movement of the first device from the first position to the second position;

search a data structure for second coefficient data that indicates a second set of coefficients of the compensation filter corresponding to the second position; and in response to a failure to locate the second coefficient data, generate the second set of coefficients based on the first set of coefficients and based on a third set of coefficients of the compensation filter, the third set of coefficients associated with a third position that is within a threshold distance of the second position of the first device.

25. The non-transitory, computer-readable medium of claim 24, wherein the instructions, when executed by the one or more processors, further cause the one or more processors to send the data structure to a filter storage to enable identification of the first set of coefficients responsive to a position-based compensation filter search operation performed on the filter storage.

26. An apparatus comprising:

means for receiving sound from a sending device and generating an audio input signal corresponding to the sound;

means for determining a first position of the means for receiving sound;

means for generating, based on the audio input signal, a first set of coefficients of a compensation filter configured to:

be applied to an audio playback signal prior to playout from the sending device, and at least partially compensate for distortion associated with sound propagation from the sending device to the first position of the means for receiving sound;

means for generating:

first coefficient data that indicates the first set of coefficients; and first position data that indicates the first position;

means for determining a second position of the means for receiving sound after movement of the means for receiving sound from the first position to the second position;

means for searching a data structure for second coefficient data that indicates a second set of coefficients of the compensation filter corresponding to the second position; and in response to a failure to locate the second coefficient data, means for generating the second set of coefficients based on the first set of coefficients and based on a third set of coefficients of the compensation filter, the third set of coefficients associated with a third position that is within a threshold distance of the second position of the means for receiving sound.

27. The apparatus of claim 26, further comprising:

means for generating the data structure, wherein the data structure includes a plurality of entries, and wherein the plurality of entries is sorted based on the first position data; and means for storing the data structure to enable identification of the compensation filter responsive to a position-based compensation filter search operation performed at the means for storing.

28. The apparatus of claim 26, further comprising:

means for applying the compensation filter to the audio playback signal to generate a pre-compensated audio signal; and means for transmitting the pre-compensated audio signal to the sending device for playout.

* * * * *